United States Patent
Wang et al.

(10) Patent No.: US 7,236,887 B2
(45) Date of Patent: Jun. 26, 2007

(54) METHOD OF DETERMINING PLANAR EVENTS FROM BOREHOLE OR CORE IMAGES

(75) Inventors: Yinyu Wang, Guyancourt (FR); Arnaud Etchecopar, Chatenay-Malabry (FR); Hitoshi Onda, Paris (FR); Gilles Mathieu, Meudon (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 10 days.

(21) Appl. No.: 11/063,945

(22) Filed: Feb. 22, 2005

(65) Prior Publication Data

US 2005/0192753 A1 Sep. 1, 2005

(30) Foreign Application Priority Data

Feb. 26, 2004 (EP) .................. 04290532

(51) Int. Cl.
*G01V 3/18* (2006.01)
(52) U.S. Cl. ...................................... 702/10
(58) Field of Classification Search ............ 702/6, 702/7, 10; 324/339, 343
See application file for complete search history.

(56) References Cited

U.S. PATENT DOCUMENTS 3,069,654 A 12/1962 Hough 5,162,994 A 11/1992 Torres
5,960,371 A 9/1999 Saito et al.

OTHER PUBLICATIONS

J. Illingworth and K. Kittler, "A Survey of the Hough Transform", Computer Vision, Graphics, Image Processing 44 (1988), p. 87-116.
V. F. Leavers, "Which Hough Transform?", CVGIP: Image Understanding 58 (1993), No. 2, p. 250-264.
Duda, R. P. and Hart, P. E., ACM, "Use of the Hough Transform to Detect Lines and Curves in Pictures", vol. 15, No. 1 pp. 11-15, 1992.
Glossop K et al "An implemetation of the Hough transformation for the identification and labelling of fixed period sinusodial curves", Computer Vision and Image understanding academic press USA, vol. 74, No. 1, 1999, pp. 96-100, p. 97, left hand column line 21—right hand column line 17.
Sarti A et al "Detection and characterisation of planar fractures using 3D hough transform" Signal processing elsevier for Eurasip Netherlands, vol. 82, No. 9, 2002, pp. 1269-1282, p. 1274 left hand column paragraph 3.1—p. 1282 righ hand column paragraph 4.

*Primary Examiner*—D. McElheny, Jr.
(74) *Attorney, Agent, or Firm*—Kevin P. McEnaney; Bryan L. White; William Batzer

(57) ABSTRACT

The present invention relates to a user-guided dip picking method from electrical borehole images using Hough Transform. It includes defining a top and bottom reference curve, applying the Hough Transform to the borehole image limited by the top and bottom reference dips so that the Hough Transform space is restrained in the neighborhood of the reference dips. A 1D average trace representing the extrema of the 3D Hough parameter space for each depth is then computed and the extrema exceeding a given threshold are search in this 1D trace. The position in the 3D Hough space of an extremum represents a dip event.

20 Claims, 4 Drawing Sheets

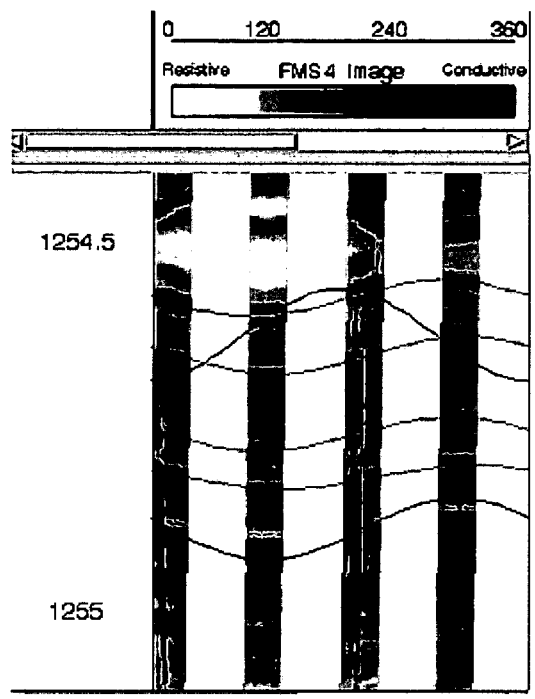
Figure 3
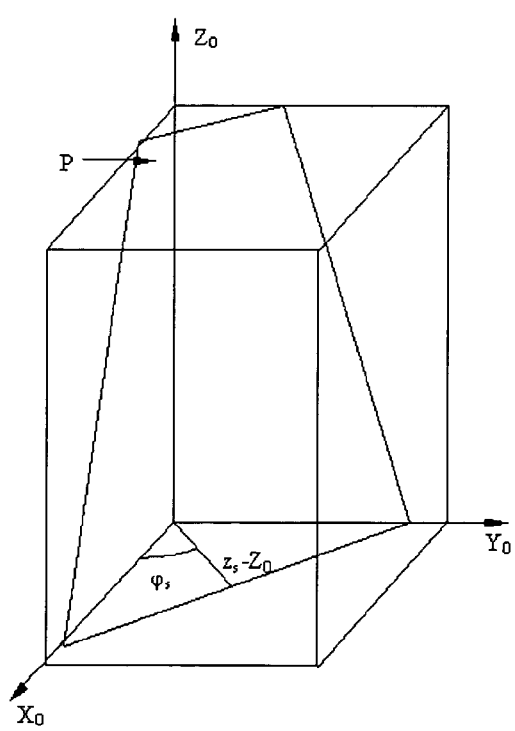
Figure 4 *(prior art)*

METHOD OF DETERMINING PLANAR EVENTS FROM BOREHOLE OR CORE IMAGES

TECHNICAL FIELD OF THE INVENTION

This application relates to borehole imaging and more specifically, the invention relates to a method for extracting planar events from images obtained by well logging techniques.

BACKGROUND OF THE INVENTION

Borehole imaging tools provide different types of borehole images, for example, electrical tools like the Formation MicroImager (FMI) tool, Resistivity At Bit (RAB) and Azimuthal Laterolog (AzLL) deliver signals that are processed and rendered visible, by photographic or other print out, or by cathode-ray tube display as a two-dimensional visible image is formed over logged segments of the borehole walls. Likewise, acoustic tools like the Ultrasonic Imaging Tool (USIT) deliver acoustic images of the borehole wall.

In such images, variations of the borehole wall caused for example by geological bed boundaries, fractures or vugs can be visually identified from sharp visible contrasts in the images, which reflect sharp changes in the formation property (e.g. resistivity) at boundaries of the beds. The images thus obtained may exhibit a resolution on the order of 0.5 cm, allowing very fine details of the formation to be distinguished due to the number of sensors in the circumferential direction, and the high rate of sampling in the longitudinal direction.

A key objective of borehole image processing is to geometrically characterize bed boundaries and fractures. When planar events (for example bed boundaries, shistosity, structures such as stilolites, faults or fractures) intersect a borehole, and are inclined or "dipping" at some angle relative to the axis of the borehole, the intersection with the borehole is an ellipse that is represented on the borehole image as a sinusoid since the borehole image is unrolled.

Extracting the dip events—and defining them in terms of sinusoids completely specified by amplitude and phases—might however be a quite tedious and automated dip picking form borehole images is indeed a highly desirable features for most geologists and geophysicist/interpreters. Dip event detection are currently performed using two kinds of applications: one-button application where the detection of dip events is fully automated for the whole depth range of a given borehole image and interactive tools which detect a single dip event with the help of the user.

One-button applications are greatly appreciated by the operators and provide high productivity. One of such applications is known from U.S. Pat. No. 5,162,994 issued Nov. 10, 1992 according to which the borehole image data is interpreted using Hough transforms. Reference is also made to U.S. Pat. No. 5,960,371 issued Sep. 28, 1999. This patent teaches use of the Hough transform to extract dip and azimuth of multiple fractures and beddings from any type of borehole image with respect to a terrestrial reference. The method is robust enough to account for noise or gaps in the images and can separate dips and azimuths of fractures from those of formations. Thus, it can detect and characterize other geometric features (e.g., linear, circular, or ellipsoidal shapes, some of which may represent vugs in carbonate reservoirs) present in the images. However, this method requires huge computation means and times.

This requirement, and the fact that most of the algorithms used for one-button application are based on parameter settings that strongly depend on the type of borehole image and/or are only suitable for a limited range of depth, explain that the one-bottom application are not widely accepted by the experts' community.

Most of the dips picking interactive tools allow users to draw and adjust a sinusoid according to the borehole image. Others, such as the software application known as "BorView", let the user pick one or several seeds from an image and then compute the sinusoid that fit to the picks. Since users are highly trained professionals, the confidence in the results is high. However, borehole image data include a multitude of such dip events so that the aforementioned manual operations have to be repeated thousand times, obviously a tedious and time-consuming operation. Hence the need for a more user-friendly method.

The present invention seeks at providing means for an improved detection of dip events.

SUMMARY OF THE INVENTION

According to a first embodiment of the present invention, this problem is solved by requesting to select a top and bottom reference in the zone of interest, hence restraining the Hough transform parameter space in the neighborhood of a given reference. More specifically, the invention relates to a method for detecting geometric pattern from an image, obtained for instance from a borehole or a core, using a Hough transform technique comprising the steps of specifying an upper and a bottom reference curve that border the geometric pattern to delimit a subset of the 3D Hough accumulator array corresponding to the whole borehole image, computing the accumulator matrix for said subset, computing a 1D average trace representing the extrema of the subset of the Hough transform accumulator for each depth; searching the 1D average trace the extrema beyond a given threshold and for each extremum in the 1D average trace, getting the horizontal coordinates of the point of the 3D Hough accumulator corresponding to this extremum at depth Zi, said horizontal coordinates representing a detected pattern.

In other words, the method of the present invention consists in requesting the user to glance over the image to identify a series of essentially co-plannar events and pointing the area of the borehole image that corresponding to the identified series. Note that in the remaining part of this document, the word "dip" will often be used to refer to any type of planar events, even though they are not "dips" from a strict geological point of view.

In another embodiment of the present invention, the user can provide three or more reference curves (corresponding to two or more series of essentially co-planar events) that are first sorted along the wellbore depth to define at least two zones of interest (each corresponding to a series of coplanar events) and the above mentioned method is repeated for each consecutive pair of reference curves.

The restriction of the Hough transform accumulator solves many problems of the prior art. The performance is considerably increased as the range of parameter space to search is reduced. The confidence is improved, as only dips close to the reference dips within a confidence interval are found. Finally, the discrimination of the type of detected dips is improved, since by focusing on two reference dips of a type, one will detect generally only dip events of the same family, as long as each family has a relatively distinct stereographic projection as it is often the practical case.

DESCRIPTION OF THE DRAWINGS

The invention will be better understood upon reading the following Detailed Description in conjunction with the drawings in which:

FIG. 3 shows a display of signals obtained from sensors mounted on 4 sets of pads angularly distributed about the axis of a well logging tool;

FIG. 4 shows the plane representing the sinusoids constrained by a seed point, following the prior art;

DETAILED DESCRIPTION

The Hough transform was first disclosed in U.S. Pat. No. 3,069,654 to P.V.C. Hough. It became in the last decade a standard tool in the domain of artificial vision for the recognition of regular curves. The Hough Transform is particularly robust to missing and contaminated data and resistant to noise. It was initially developed to detect straight lines in binary images and was originally used in fitting a set of line segments to a set of co-linear points. However, due to its simplicity, the technique was extended to detect other types of curves that can be easily described analytically such as circles and ellipses. The generalized Hough transform was later developed to recognize patterns that do not have an analytic description.

Details on the Hough transform can be found in numerous papers, in particular by J. Illingworth and J. Kittler, "*A Survey of the Hough Transform*", Computer Vision, Graphics, Image Processing 44 (1988), p. 87-116, by V. F. Leavers, "*Which Hough Transform?*", CVGIP: Image Understanding 58 (1993), No. 2, p. 250-264, by Duda, R. P. and Hart, P. E., ACM, "*Use of the Hough Transform to Detect Lines and Curves in Pictures*", vol. 15, No. 1 pp. 11-15 and by J. Illingworth and J. Kittler, "*A Survey of the Hough Transform*" Computer Vision, Graphics and Image Processing, vol. 44, (1988) pp. 87-116, these three papers incorporated hereby by reference.

Figure 1:
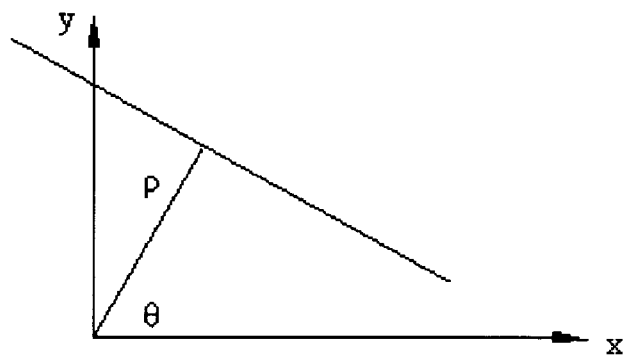
FIG. 1 illustrates the parametric equation of a straight line.

The basic principle of the Hough Transform is to map data into a parameter space, which is appropriately quantized, and then seek for the most likely parameter values that describe the feature to detect. As shown FIG. 1, any straight line can be conveniently expressed by the parametric equation: $x \cos \theta + y \sin \theta = \rho$, where $\rho$ is the length of a normal from the origin to this line and $\theta$ is the orientation of with respect to the X-axis.

It results that the parameters $\rho$ and $\theta$ fully described any straight line. These parameters are defined as the coordinate system of the 2D Hough parameter space, and therefore, each straight line corresponds to a point in the Hough parameter space. The transform is implemented by quantizing the 2D Hough parameter space into a grid (a 2D array) called accumulator. Each cell retrieves a value that is the summation of the image pixel values along the straight line. Peaks in the accumulator array represent strong evidence that a corresponding straight line exists in the image.

Figure 2A:
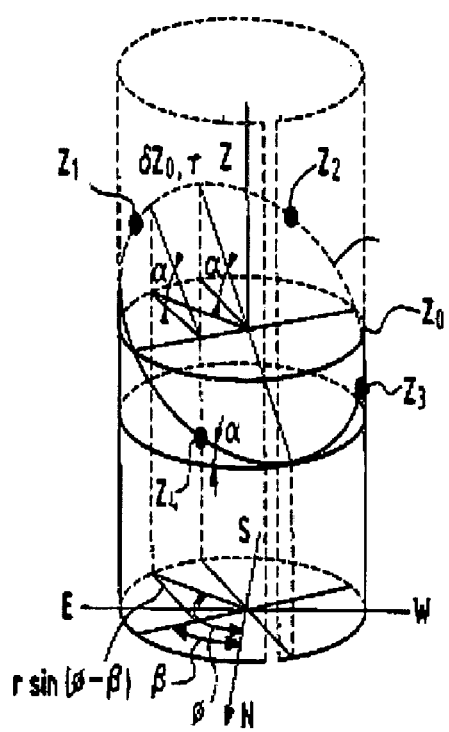
FIG. 2A shows a bedding plane or fault intersecting a borehole at an angle relative to the axis of the borehole to create a dipping event and the intersection is represented by an ellipse.
Figure 2B:
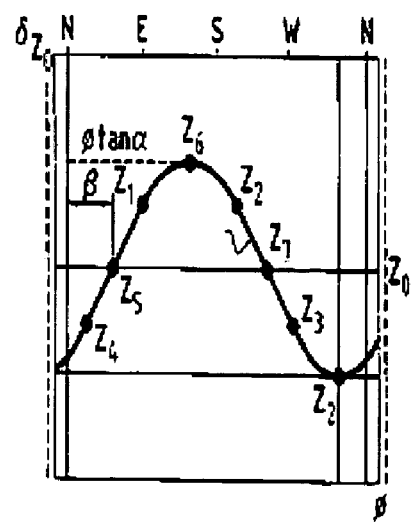
FIG. 2B shows a representation of the portion of the wall of the borehole represented in FIG. 2A unrolled to a flat position.

Now, referring to FIG. 2, a borehole can be schematically described by a circular cylinder having a borehole axis. A plane—such as a bedding plane or fault—cuts the cylinder at an angle relative to the borehole axis, along an ellipse. When the portion of the wall of borehole represented in FIG. 2A is unrolled to a flat position, the ellipse appears as a sinusoid as shown in FIG. 2B.

Every sinusoid that appears in the borehole image is a two-dimensional curve that may be expressed by the equation $z = Z_0 + A \cos(\phi - \phi_0)$, where $\phi$ and $z$ are the coordinate system of the borehole image space, and A is the amplitude of a dip indicated by the two dimensional sinusoid in a well log image, $\phi_0$ is the offset (phase) of azimuth of the dip, and $Z_0$ is the zero crossing depth of the sinusoid When mathematically developing this equation for the Hough transform we get $Z = Z_0 + A \cos \Phi_0 \cos \Phi + A \sin \Phi_0 \sin \Phi$. After setting $X_0 = +A \cos \Phi_0$ and $Y_0 = +A \sin \Phi_0$, the equation becomes $Z = Z_0 + X_0 \cos \Phi + Y_0 \sin \Phi$. Thus, every sinusoid $z(\phi)$ is described by three parameters, $X_0$, $Y_0$ and $Z_0$ that are defined as the coordinate system of a three-dimensional Hough parameter space.

By performing a summation along the sinusoidal features of the borehole image pixel measurements, a value can be measured and associated with each point (X0, Y0, Z0) in the three dimensional Hough parameter space. These values are stored in an accumulator (a 3D matrix). The value assigned to a cell in the accumulator is high (or very low) if the sinusoid associated with that point lies on a sinusoidal feature having a high pixel value in a borehole image. Conversely, if there is no clear sinusoidal feature in the borehole image, a medium background measurement is assigned. Therefore, every cell in the Hough accumulator in which the assigned value reaches local extremum corresponds to a clear sinusoidal feature.

Generally speaking, the Hough transform provides a robust technique for feature detection since is not sensitive against image noise and is tolerant of gaps in feature. However, when used for detecting geometric features having three or more parameters, the performance is poor. To fill the three-dimensional Hough accumulator, at least four embedded iteration loops are necessary. Assume the borehole to treat is of 200×4000 pixels (this is about 10 meter of FMI image), and the number of cells in axis X0 and Y0 of the Hough accumulator matrix is 50, then the complexity of computation is 50×50×4000×200=2,000,000,000.

Another drawback is that it may fail in case of parallel layering and lamination. FIG. 3 that shows a display of signals obtained from sensors mounted on 4 sets of pads angularly distributed about the axis of a well logging tool. In addition of the true sinusoids 10 that correspond to bed boundaries, the system may also "detect" sinusoids such as the sinusoids 20 because the summation of the image pixel values along these curves is big enough to be considered as a local maximum.

One way of overcoming the above-mentioned drawbacks is the so-called seed point method where the user picks a seed point on the image, and the sinusoid to seek is supposed to pass through the picked point, within a given tolerance.

This constraint suppresses 1 degree of freedom of the sinusoid. Let $(\phi_s, z_s)$ be the seed point. The three parameters of sinusoid is object to: $Z_0 + X_0 \cos \phi_s + Y_0 \sin \phi_s = z_s$. This equation presents a plane P in the 3D Hough parameter space as shown FIG. 4. For a given zero crossing depth $Z_0$, all the sinusoids passing through the seed point are represented by a straight line in the Hough transform space, which has orientation=$\phi_s$ and normal=$z_s-Z_0$.

As a result, the search for extremum in the accumulator is restrained within this 2D surface instead of the whole 3D space. In practice, the user picked point may not pass exactly through the sinusoid to detect, i.e. some tolerance must be given to the position of the seed point. Thus the surface is no more a 2D surface but is getting some thickness. However, the search region is considerably reduced. Suppose that the number of cells of accumulator for each line is still 50, and the tolerance is +/−2 cells, i.e. the thickness of each line is 5 cells, then the computation complexity for the above example is reduced to 50×5×4000×200=200000000, hence a performance improved by 10 times.

Obviously this method can only be used in interactive mode application and indeed, requires significant user's time due to the number of events to be detected.

The invention proposes a method that differs from both the "seed point" method and the "true" Hough transform technique where the accumulator is computed for a whole depth interval (to be noted that the term depth interval is used to refer to a longitudinal section of the borehole and consequently corresponds effectively to the depth only in the case of vertical wells; in deviated or horizontal wells, the term refers actually to the distance to the surface).

According to the invention, instead of asking user for the depth interval in the borehole image to process, he/she is invited to specify a top sinusoid and a bottom sinusoid. These two sinusoids are used to define the range of dip parameters used as reference in the dip event detection, as well as the depth interval to process.

The dips to search must remain close to the reference dips; i.e. the amplitude and azimuth of each resulting dip must be within the neighborhood of the amplitude and azimuth of the reference dips. If the top and bottom reference dips are different, the value of amplitude and azimuth used as reference in searching a sinusoid should vary in function of depth. I.e., if the sinusoid to detect is near the top dip, the amplitude and azimuth of top dip are used as reference; when the processing depth is moving down to the bottom, the reference values are getting close to those of the bottom dip.

This constraint is mathematically expressed as follows. Keep using the parameter pair $(X_0, Y_0)$ defined in (2) which are equivalent to amplitude and azimuth, let $(Xt, Yt, Zt)$ and $(Xb, Yb, Zb)$ be the parameters of top and bottom sinusoids, and let $(Xr(Z_0), Yr(Z_0))$ the reference values of sinusoid for depth $Z_0$, they may be computed by linear interpolation between $(Xt, Yt)$ and $(Xb, Yb)$:

$$Xr(Z_0)=Xt+(Z_0-Zt)*(Xb-Xt)/(Zb-Zt) \text{ and}$$

$$Yr(Z_0)=Yt+(Z_0-Zt)*(Yb-Yt)/(Zb-Zt).$$

The term of "close to" is mathematically described as: the Euclidean distance from point $(X_0, Y_0)$ to the reference point $(Xr, Yr)$ in the Hough parameter space is less than a predefined confidence interval, R. That is, the dip to search must belong to a subset of Hough parameter space:

$$\Omega=\{(X_0, Y_0, Z_0)|Z_0\in[Zt, Zb], \|(X_0, Y_0)-(Xr(Z_0), Yr(Z_0))\|<R\}$$

Figure 5:
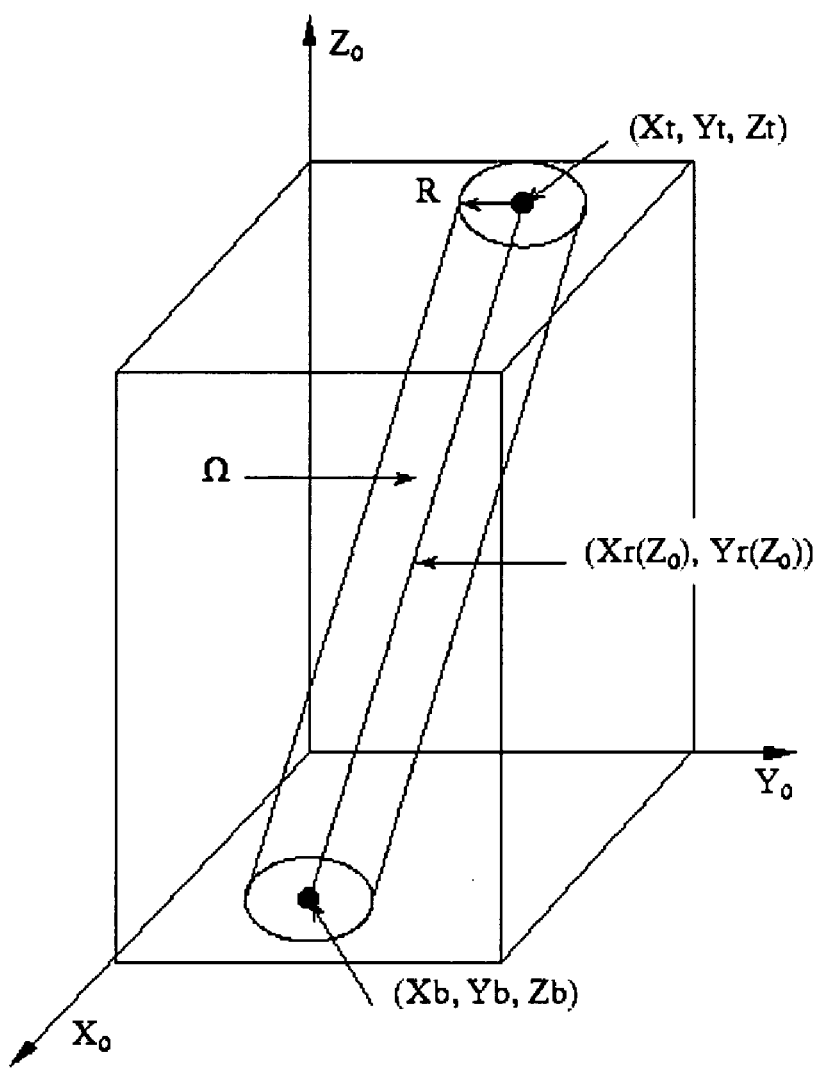
FIG. 5 shows the plane representing the sinusoids constrained according to the present invention.

This subset is illustrated in FIG. 5.

Obviously the two problems with Hough transform mentioned above are fixed by this constraint. Under this constraint, it is not necessary to fill the whole 3D Hough accumulator matrix, but only the small portion $\Omega$. In practice it is enough to set R to 2 times cell spacing. Thus the number of cells to fill in axis $X_0$ and $Y_0$ are 5, and the computation complexity is reduced to 5×5×4000×200=20000000, i.e. the performance is improved by 100 times.

Under this constraint, the wrong dips, as the sinusoids 20 shown in FIG. 3, will not be found because the corresponding points in the Hough parameter space are out of $\Omega$.

Figure 6:
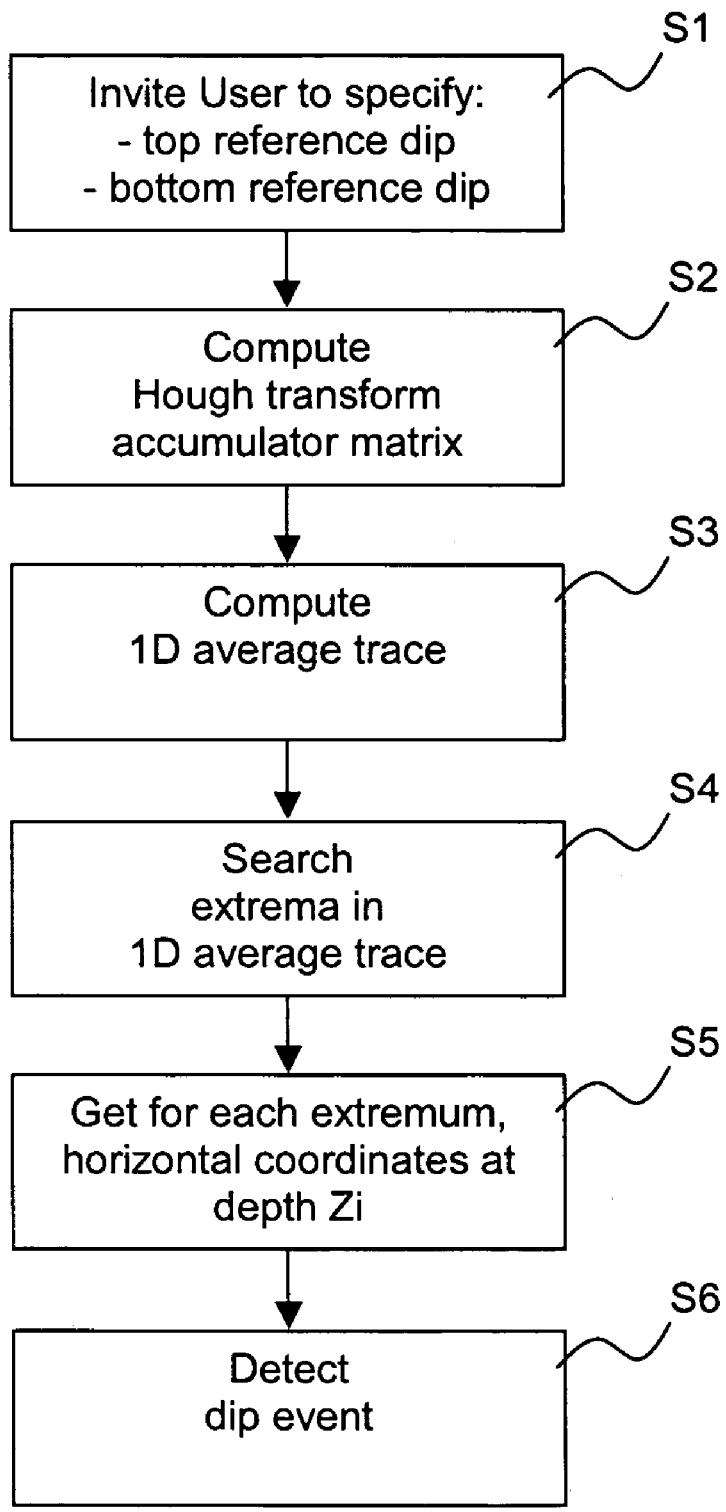
FIG. 6 shows the main steps of the method according to the present invention.

The method proposed in the present invention for interactive multiple dip event detection may be accomplished in the following steps, as shown in FIG. 6:

Invite the user to specify a top and a bottom reference dips (Step S1).

Fill the subset $\Omega$ of the Hough transform accumulator, as described above (Step S2).

Compute a 1D average trace representing the extrema of the subset $\Omega$ for each depth (Step S3). This 1D average trace is preferably computed using the algorithm known form International Patent Application PCT/EP03/12205, hereby incorporated by reference:

Let $H(X_0, Y_0, Z_0)$ be a 3D-accumulator matrix of Hough transform.

Compute $H_{average}$, the mean value of $H(X_0, Y_0, Z_0)$

Centralize $H(X_0, Y_0, Z_0)$ in the value domain:

$H_c(X_0, Y_0, Z_0)=H(X_0, Y_0, Z_0)-H_{average}$

For each depth $Z_0$, find the maximum of absolute value $V(Z_0)$ of $H_c$:

$$V(Z_0)=\max_{X0, Y0}\{abs(H_c(X_0, Y_0, Z_0))|Z_0\}$$

Search in the 1D average trace $V(Z_0)$ the extrema exceeding a given threshold (Step S4).

For each extremum $Vi(Zi)$ found in step d), get the horizontal section of $\Omega$ at depth $Zi$, search the extremum in this section (Step S5). The coordinates of the found extremum, $(Xe, Ye)$ represents one dip event to detect (Step S6).

The method can be generalized to multiple working zones, and is therefore also available for batch mode. In this case, the user is invited to specify three or more reference dips that are sorted in depth order and the process. Note also that the reference curves may also be supplied automatically by a database, hence a solution particularly suitable for batch modes. According to an embodiment of the present invention, the user may identified a first series of planar events (for instance the bed boundaries, usually quite easy to recognize) and after the parameters of this series have been computed according to the invention, the method is used to look automatically for planar events that are for instance perpendicular to this first series or oriented according to another specified angle.

In the above description, it has been assumed that the planar event intersects a circular cylinder. In practice, the borehole may have an elliptic cross section. However, the method of the present invention can easily be adapted to this case for instance by using the method disclosed in U.S. Pat. No. 5,960,371, in the paragraph entitled "*Parametric representation of a Planar Structure Intersecting with an Elliptic Cylinder*", hereby incorporated by reference.

Since the method of the invention drastically reduces the number of cells in the Hough accumulator, it makes it possible to use median value instead of a simple summation (or in other words an arithmetic average) along the sinusoidal feature of the pixel measurements. Note however that this method increases the complexity of the computation by an order of magnitude of 100, thereby stepping back from the simplicity underlined in the above description, but on the other words, leading to a more robust detection.

The invention claimed is:

1. A method for detecting planar events from an image using a Hough transform technique comprising the steps of:
   a. Storing a borehole image into a computer based system; said computer based system performing the following tasks:
   b. Invite a human user to specify an upper and a bottom reference curve that border the pattern corresponding to a series of essentially co-planar events to delimit a subset of the 3D Hough accumulator array corresponding to the whole borehole image, said reference curves being used to define a range of reference planar event parameters and a depth interval;
   c. Computing the accumulator matrix for said subset;
   d. Computing a 1D average trace representing the extrema of the subset of the Hough transform accumulator for each depth;
   e. Searching in the 1D average trace the extrema beyond a given threshold;
   f. For each extremum in the 1D average trace, getting the horizontal coordinates of the point of the 3D Hough accumulator corresponding to this extremum at depth Zi, said horizontal coordinates representing one planar event to detect; and
   g. Detecting the planar events from the image from all the planar events detected from step (f);
   h. Storing the detected planar events from the image in the computer based system for retrieval by the human user.

2. A method for detecting multiple set of planar events from an image using a Hough transform technique comprising the steps of:
   a. Storing a borehole image into a computer based system; said computer based system performing the following tasks:
   b. Invite a human user to specify at least three reference curves to border the multiple pattern corresponding to the multiple set of a series of essentially co-planar events;
   c. Sorting the reference curves along depth;
   d. For each consecutive pair of reference curves, said reference curves being used to define a range of reference planar event parameters and a depth interval:
      i. Computing the accumulator matrix for the subset of the 3D Hough accumulator delimited by said reference curves;
      ii. Computing a 1D average trace representing the extrema of the subset of the Hough transform accumulator for each depth;
      iii. Searching in the 1D average trace the extrema beyond a given threshold;
      iv. For each extremum in the 1D average trace, getting the horizontal coordinates of the point of the 3D Hough accumulator corresponding to this extremum at depth Zi, said horizontal coordinates representing one planar event to detect;
      v. Detecting the planar events from the image from all the planar events detected from step (iv);
      vi. Storing the detected planar events from the image in the computer based system for retrieval by the human user.

3. The method according to claim 1, wherein said image is a borehole image or a core image from a subterranean well.

4. The method according to claim 1, wherein said geometric pattern are represented by a sinusoid.

5. The method according to claim 1, wherein said reference curves are sinusoids.

6. The method according to claim 1, wherein said reference curves are stored in a database.

7. The method according to claim 1, wherein said reference curves are computed by reference to planar events already identified.

8. The method according to claim 1, wherein said reference curves are provided by the user.

9. The method according to claim 8, wherein said reference curves are traced by the user over the wellbore image.

10. The method according to claim 1, wherein the 1D average trace is obtained by computing $H_{average}$, the mean value of $H(X0, Y0, Z0)$ where $H(X0, Y0, Z0)$ is the 3D-accumulator matrix of the Hough transform, centralizing $H(X0, Y0, Z0)$ in the value domain $Hc(X0, Y0, Z0)=H(X0, Y0, Z0)-H_{average}$ and, for each depth $Z0$, finding the maximum of absolute value $V(Z0)$ of Hc.

11. The method according to claim 1, wherein the accumulator matrix of the Hough transform is computed by computing the median value along the sinusoidal features of the image pixel measurements.

12. The method according to claim 2, wherein said image is a borehole image or a core image from a subterranean well.

13. The method according to claim 2, wherein said geometric pattern are represented by a sinusoid.

14. The method according to claim 2, wherein said reference curves are sinusoids.

15. The method according to claim 2, wherein said reference curves are stored in a database.

16. The method according to claim 2, wherein said reference curves are computed by reference to planar events already identified.

17. The method according to claim 2, wherein said reference curves are provided by the user.

18. The method according to claim 17, wherein said reference curves are traced by the user over the wellbore image.

19. The method according to claim 2, wherein the 1D average trace is obtained by computing $H_{average}$, the mean value of $H(X0, Y0, Z0)$ where $H(X0, Y0, Z0)$ is the 3D-accumulator matrix of the Hough transform, centralizing $H(X0, Y0, Z0)$ in the value domain $Hc(X0, Y0, Z0)=H(X0, Y0, Z0)-H_{average}$ and, for each depth $Z0$, finding the maximum of absolute value $V(Z0)$ of Hc.

20. The method according to claim 2, wherein the accumulator matrix of the Hough transform is computed by computing the median value along the sinusoidal features of the image pixel measurements.

* * * * *